March 30, 1954   F. W. RIDDLE ET AL   2,673,535
CHECK WIRE DOFFING MEANS
Filed Feb. 9, 1950   3 Sheets-Sheet 1

INVENTOR.
FREDERICK W. RIDDLE.
JOSEPH S. PILLAR.
BY Christy, Parmelee & Strickland
ATTORNEYS.

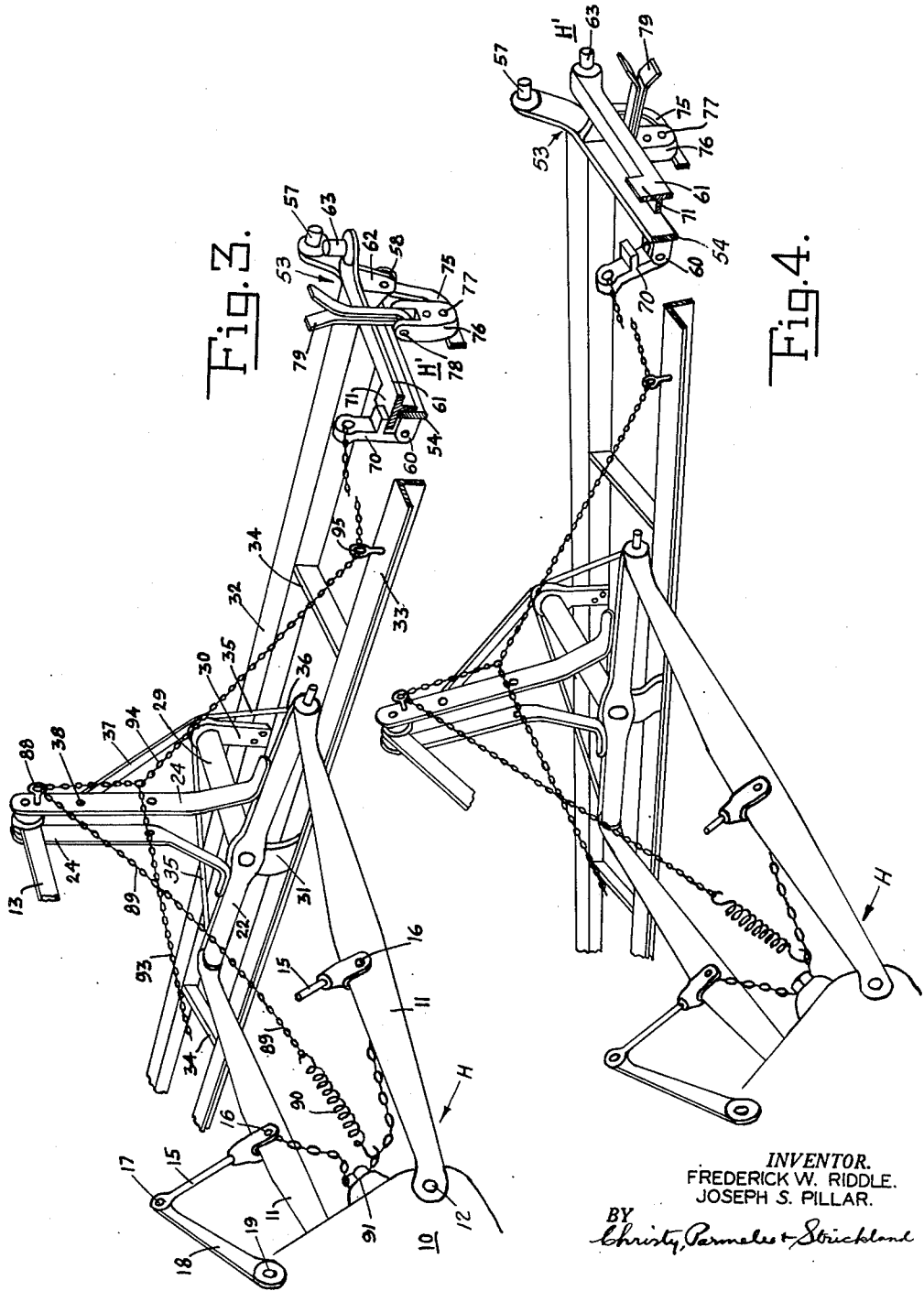

March 30, 1954 F. W. RIDDLE ET AL 2,673,535
CHECK WIRE DOFFING MEANS
Filed Feb. 9, 1950 3 Sheets-Sheet 3

*INVENTOR.*
FREDERICK W. RIDDLE.
JOSEPH S. PILLAR.
BY
Christy, Parmelee + Strickland

ATTORNEYS.

Patented Mar. 30, 1954

2,673,535

UNITED STATES PATENT OFFICE 2,673,535

CHECK WIRE DOFFING MEANS

Frederick W. Riddle, Sewickley, and Joseph S. Pillar, McKees Rocks, Pa., assignors, by mesne assignments, to Ford Motor Company, Dearborn, Mich., a corporation of Delaware Application February 9, 1950, Serial No. 143,272

1 Claim. (Cl. 111—48)

Our invention relates to what is called a "check row planter," a mechanism for planting seed such as corn, beans, etc., in uniform hills uniformly spaced apart longitudinally and transversely. In these machines, the seed-depositing mechanism is actuated by a forked lever pivotally mounted on the machine and operated by enlargements, ofttimes called "knots" or "buttons," located at predetermined spaced intervals on a stationary wire, called the "check wire," which can be placed in desired locations extending across the field to be planted. The ends of the check wire are secured adjacent the ends of the rows of hills.

It is common practice to attach one end of the check wire to a stake at a position very close to the ground then stretch the wire across the field to a point near the ground on a stake driven into the ground at a position on the opposite end of the field. At the beginning of the planting operation, the check wire is placed in position passing between the bifurcated ends of the check lever which position may advantageously be around 15 to 18 inches above the ground. As the planter approaches the end of the row and near the stake, it is evident that the wire assumes an increasingly steep slope until further progress of the check lever along the wire would cause the wire or a part of the planter to be damaged or the stake uprooted. At the end of the row, it is necessary to disconnect or spill the wire from the check lever mounting. At that time, it is necessary to lift the planter out of ground engagement so that the planter and tractor may be swung to a position to start the return row across the field.

In order that the check wire may spill out of the check lever at the end of the row, we arrange the check lever mounting to permit it to be tipped away from the planter frame. Under planting conditions, a part of the check head is hinged to the side of the planter and is retained in a position where the check wire operatively engages the check lever by a latching device. The latching device in known use has an extension, usually a cord, which reaches to a position conveniently near the operator, whereby the latch may be released by a pull exerted by the operator by means of the extension. Sometimes the operator neglects to pull the cord to unlatch the wire and damage to the planter or wire commonly results.

We have invented a mounting including a latch operating device whereby the latch is automatically operated to release a portion of the check head when the operator operates the trailing hitch link mechanism, ofttimes referred to as a "three point hitch," which is in common use to connect the planter to a tractor. The hitch is so arranged that in general there are two spaced draw bars or tension links hinged to the rear housing of a tractor and extending rearwardly thereof, and above the draw bars and centrally of them a compression link is hinged to the tractor housing. The ends of the link and draw bars are swivelly mounted on a connecting member forming a part of the planter. The draw bars and connected link are moved upwardly or downwardly by the action of mechanism forming part of the tractor, which mechanism is controlled by an operating lever located conveniently near the driver's seat. By rotating the hitch links about the tractor, often referred to as "raising" the links in one direction, the planter is lifted from the ground-engaging position, and by rotating the links in a direction opposite to that first mentioned ofttimes referred to as "lowering" the hitch links, the planter is placed in the desired ground engagement. We have taken advantage of this movement of the hitch links to provide an arrangement which upon raising of the links will cause the latch on the check lever mounting to be released, thus permitting a movable part of the check head and pivoted check lever to fall sideways away from the planter frame. Thus when the driver moves the operating lever to cause the planting mechanism to be lifted from ground-engaging position, the check lever is caused to drop to check wire releasing position.

One of the objects of our invention is to provide new and improved means whereby the check lever may be automatically released from the check wire by activation of the hitch link mechanism.

Another object of the invention is to provide a positive and simple check wire release which is automatically operated by movement of an implement hitch.

These and other objects and advantages of our invention will be apparent to those skilled in the art after a consideration of the following description read in conjunction with the accompanying drawings wherein we have illustrated the presently preferred embodiment of our invention.

In the drawings:

Figure 3 is an isometric view somewhat diagrammatic showing the principal parts of the check head release mechanism, part of the structure being broken away, and shows the relative disposition of parts when the planter is lowered to ground engagement;

Figure 4 is a view similar to Figure 3, but showing the relative disposition of the parts when the planter is in raised position and the check lever has been dropped to wire releasing position;

Figure 1:
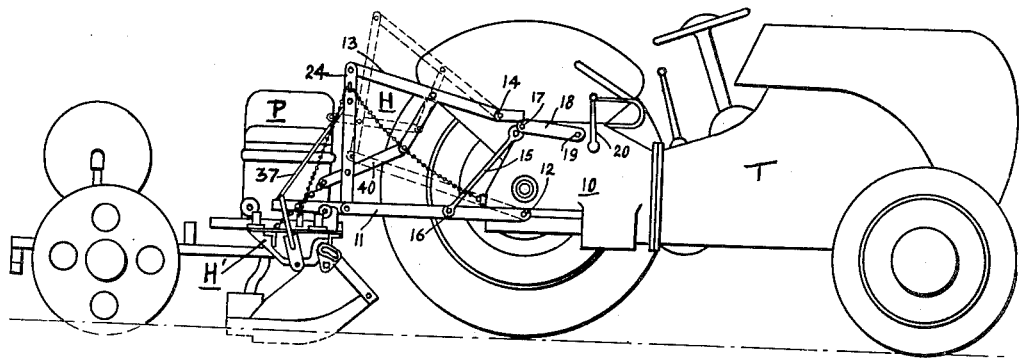
Figure 1 is a view in side elevation of a conventional tractor and a corn planter hitched together by means of a three point hitch.

In the drawings, we have illustrated our invention as used in connection with a typical corn planter P which is operatively connected to a conventional power tractor T by means of a power lifted trailing hitch mechanism H. Only so much of a corn planter and tractor will be described as are deemed necessary for a complete understanding of the invention.

The tractor T has a differential housing 10 to the rear of which a well-known form of trailing hitch mechanism H is attached. The hitch mechanism includes a pair of draft links or draw bars 11 which are pivotally mounted for up and down movement at one end of each at points 12 on each of the opposite sides of the housing, and adjacent the lower rear portion of the housing. A compression link 13 is pivotally mounted at point 14 on the upper portion of the housing. Point 14 is located on the upper portion of the housing and at a position midway (in relation to spaced points 12 and rearwardly (in relation to the tractor) thereof. The draft links are longer than the compression link, the relative positions of the points 12 and 14 and the connection, later to be described, between the draw bars 11 and compression or upper link 13, are so arranged and proportioned that when the connected planter P is in the working position shown in full lines in Figure 1, the uprights 24, later to be described, which form in part a connection between the outer end of the draw bars 11 and upper link 13 are substantially vertically aligned, and when the links are in the raised position (as shown in dotted lines in Figure 1) the compression link 13 is inclined upwardly at an angle greater than the angle of the inclination of the draw bars 11.

A lifting rod 15 is pivotally secured to each draw bar 11 at a point 16 between the ends of the draw bars and extends forwardly and upwardly, and is connected by a universal pivot 17 to power operated levers 18 pivoted on the housing at points 19 there being one lever 18 on each side of the upper part of the housing. The levers 18 in turn are rotated through a limited arc about points 18 by a power apparatus (not shown) contained in the housing 10 which is controlled by the operation of a control arm 20.

In Figure 1, the upper limit of travel of the links is shown in dotted lines. It is of course to be understood that the connected planter will be correspondingly lifted out of ground-engaging position to what is frequently termed the "raised" position when the hitching mechanism is rotated.

Figure 2:
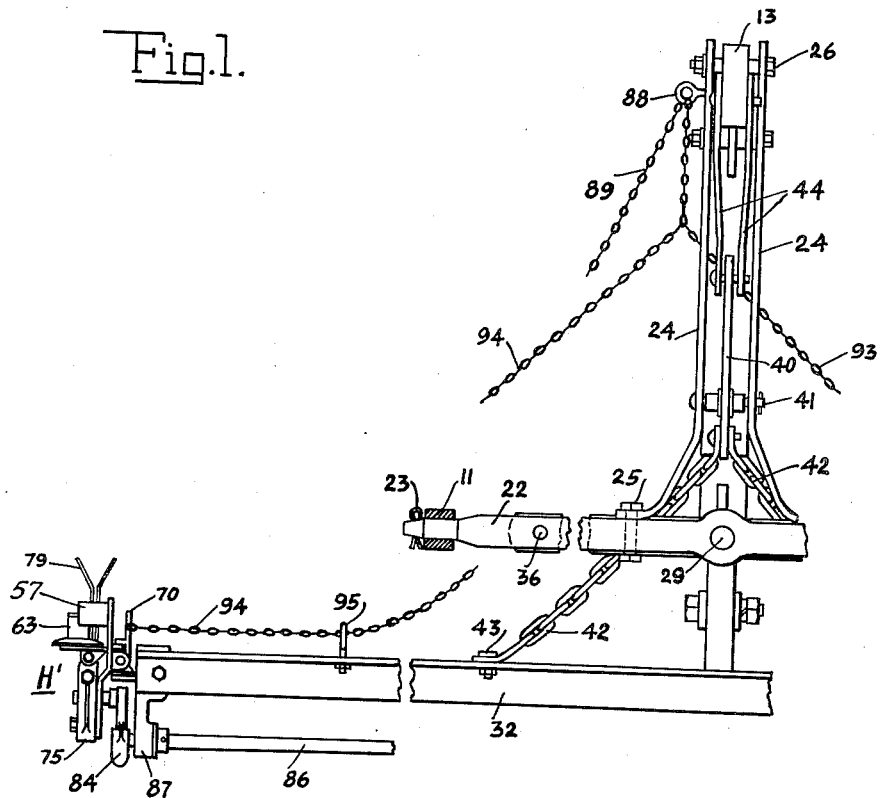
Figure 2 is an enlarged fragmentary view in end elevation looking from the tractor and toward the rear of the hitch.

The planter P, which is more or less conventional, includes a horizontal spacer member 22, on the outer ends of which the draw bars or draft links 11 are pivotally received and retained against sidewise movement by appropriate cotter pins 23. Extending upwardly from the spacer member are two spaced apart vertical braces 24, shaped as shown (Figure 2), which are rigidly secured by bolts 25 to the spacer bar 22, one on each side of the center thereof. The upper ends of the braces 24 embrace the compression link 13 and are pivotally secured to it by a bolt 26 which extends through aligned openings in the ends of the braces and the compression link. The upright braces 24 and the connected spacing member 22 form part of the planter.

A horizontal stub shaft 29 extends rearwardly from the center of spacer member 22 (see Figure 3) and swivelly depending from the stub shaft are two spaced hangers 30 and 31, to which the parallel planter frame angles 32 and 33, respectively are fastened to extend transversely, and generally parallel to the spacer member 22. The angles are suitably braced, as by braces 34. The end of the stub shaft 29, distant from the spacing bar is held rigidly by a strap brace 35, the ends of which are bolted at points 36 spaced from the stub shaft, to the spacer 22. A bracer bar 37 is also secured to the outer end of the stub shaft 29 and extends angularly upwardly to a position between the upright braces 24 to which it is secured by the bolt 38.

We also provide anti-tilt mechanism, whereby undesirable tilting of the planter may be avoided when it is being carried in the raised position, but will allow limited transverse tilting when the planter is in ground engagement. For this purpose, we provide an actuator lever 40 which projects through the uprights 24 and is pivoted to turn at point 41, part way of its length. The rear end is connected by means of flexible chains 42 to points 43, on angle members 32, one on each side of the center. The front end of the lever 40 is pinned between the ends of two spaced arms 44, the other ends of the arms being pinned to the upper link 13. The lever linkage is so designed, and the chains are of such length, that when the planter is in lowered position, there is slack in the chains to permit limited transverse movement around the stub shaft 29, and when the hitching links are in raised position, the chains are taut, so that no transverse movement is permitted.

Figure 5:
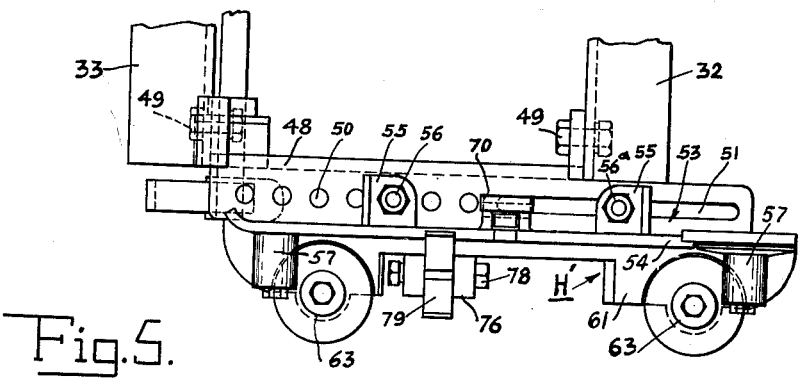
Figure 5 is a plan view of a suitable check head.
Figure 6:
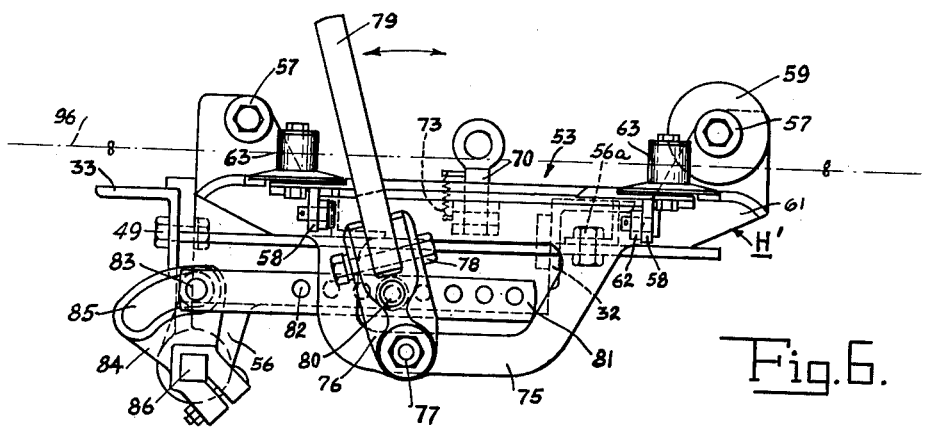
Figure 6 is a side elevation of the check head.
Figure 7:
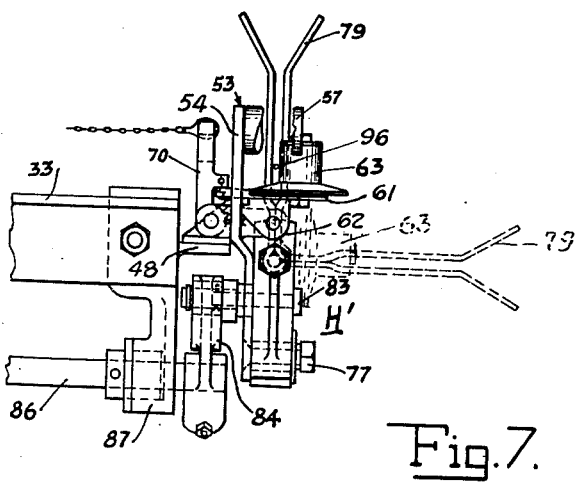
Figure 7 is an end view of the check head.

A check head generally designated H' which is best shown in Figures 5, 6, and 7, is mounted at each end of the transverse frame members 32 and 33 and bolted thereto. The check head has a horizontal rigid shelf 48 which is secured as by bolts 49 to the ends of the frame angle members 32 and 33. A spaced series of bolt holes 50 are located along the left-hand portion of the flat top of the shelf, and an elongated slot 51 is provided in the right-hand portion. A slidable frame member 53 having a vertical side piece 54 with shelf-engaging lugs 55 is mounted on the shelf by means of a bolt 56 which passes through an appropriate hole 50 and a bolt 56a which passes through the slot 51. The bolts are provided with suitable nuts. This arrangement is very useful when it is desired to shift the position of the slidable member 53; the bolt 56a is loosened, the bolt 56 is removed and the member 53 may then be moved forward or backward to the new desired position. The bolt 56 is inserted in the proper hole and the bolts 56 and 56a are tightened. The bolt 56a need not be removed and serves to prevent accidental displacement of the members 53 when the bolt 56 is removed for adjustment or replacement.

Adjacent the ends of the frame member 53, horizontally extending guide rollers 57 are mounted on appropriate vertical extensions.

From the vertical side piece 54, two spaced brackets 58 extend. An angle shaped movable frame portion 61 is pivotally secured by its eye brackets 62 to the brackets 58 so that it may rotate outwardly through approximately 90°, as in Figure 7. The movable frame portion 61, which is shorter than the slidable member 53, has vertical guide rolls 63 mounted adjacent each of its opposite ends so that these rolls are located between the guide rolls 57, and together with the rolls 57 define a path for the check wire. As is shown diagrammatically in Figure 4, the movable frame 61 may rotate outwardly, around the pins which pass through brackets 58 and 62, to a position approximately 90° from its operative position illustrated in Figure 3. The movable frame 61 is retained in operative position by the engagement of a latch 70, which is pivotally mounted on the slidable member 53, with a a projection 71 which extends inwardly from a central position on member 61. The latch is urged by spring 73 into latching engagement with projection 71.

Depending from the member 53 is a U-shaped bracket 75 and adjacent one end of it (see Figure 6) a check lever mounting 76 having a bifurcated upper portion, is pivoted at 77. Pivotally secured between the bifurcated ends by a bolt 78 so that it may fall away, as shown in Figures 4 and 6, is a check lever 79. The check lever has two uprights which are spaced apart a sufficient distance to permit a check wire, but not the buttons thereon, to pass through. The uprights are each angled outwardly at the top as shown to form an open Y. Between the bolt 78 and the pivot 77, a threaded bolt 80 is provided which passes through the mounting 76, and pivotally connects the mounting 76 to an adjustable link arm 81 in which link arm suitably spaced bolt receiving holes 82 are arranged. One end of the link arm 81 has a pin connection 83 to a crank arm 84 which has a curved slot 85 in the upper end thereof in which a suitable pin is received. This allows the crank arm 84 to be moved in one direction independently of the link arm 81. The crank arm 84 is rigidly secured at the lower end to a transverse check shaft 86, which is rotatably received in a bracket 87 depending from the fixed shelf 48. The slot 85 permits the check shaft on either side to be rotated without causing the connected parts on the other side of the shaft to be moved during the planting operation. Much noise, wear, and clatter are thus dispensed with.

Closely adjacent the upper end of one side of the braces 24 an eye 88 is secured. A flexible member 89, here shown as a chain is secured at one end, by means of a spring 90, to a point 91 near the bottom of the housing 10, and is threaded through the eye 88 and thereafter it is divided into two branches 93 and 94, one of which 94 extends through the eye 95 on frame angle 33 and is fastened to the eye of latch 70 (Figures 3 and 4). The other branch 93 extends in similar fashion to the latch on the other corresponding check head.

The length of the various chains are so adjusted that when the link hitch is in the lower or ground-engaging position of the planter as in Figure 3, the latch 70 and its companion latch on the opposite check head are in engagement with the projection 71 in the movable member 61 of the check head and the movable member 61 is in the operative position, shown in Figure 3. In this position, the check wire 96 is confined between the guide roll 57 and 63 and passes between the spaced apart upright portions of the check lever as shown in Figures 6 and 7. When a button on the check wire engages the check lever 79 during forward movement of the planter, to the left as viewed in Figure 6, the check lever is moved clockwise around the pivot 77 as viewed in Figure 6 to a position where the check wire rides out of the check lever, whereupon the check lever causes the transverse check or rock shaft 86 to be angularly moved and thus sets in motion apparatus which plants the seed corn in the desired position. The construction and operation of such equipment is well known and requires no further mention. At the limit of rotation of the check lever, the button on the check wire rises out of engagement with the forked check lever. A spring on the rock shaft 86 rotates the rock shaft back to its original position and the check lever is reset (Figure 6) by the action of the rock shaft transmitted through the arm 84, link 81 and pin 80. The check lever is returned to its original position and is ready for operation by the next button.

At the conclusion of the planting of the row, the tractor operator moves control lever 20 whereupon the hitch links are raised to the dotted position shown in Figure 1, and also schematically illustrated in Figure 4. The eye 88 is then at a greater distance from the point of attachment of the spring 90 to the tractor housing and consequently a pull will be exerted on the chain branches 93 and 94, and on the latches 70 to pivot them to the disengaged position shown in Figure 4. This releases the movable frame portion 61, and allows the check lever and frame to fall away and spill or doff the check wire. When the planter is in position to again start planting, the check wire is replaced in the check lever and the parts returned to the positions shown in Figure 6, where the latch restrains the movable frame portion 61.

We have described and illustrated the presently preferred embodiments of our invention, and it is to be understood that this is by way of example, and that modifications may be made and the invention may be otherwise embodied and produced within the scope of the appended claim.

We claim:

In combination, a tractor having a pair of transversely-spaced power-lifted trailing draft links and a central top link vertically spaced above said draft links, a check row planter comprising a transversely extending main frame and an upstanding subframe mounted on the central part of said main frame, transversely spaced means connecting said subframe to said draft links, means connecting the top part of said subframe to said top link, a check head respectively mounted on each of the lateral extremities of said main frame, each check head including a stationary portion and a movable portion pivoted to the stationary portion between which portions a check wire may be retained, a shiftable latch for each movable portion engageable therewith to hold the same in check wire retaining relationship with the stationary portion, said movable portion upon disengagement of its latch falling away from its stationary portion to doff the check wire, a first flexible element interconnecting said latches, an eyelet type guide means on the top part of said subframe, and a second flexible element passing through said guide means and having one end connected to a fixed point on the tractor and the other end connected to a medial portion of said first flexible element, the lengths of said flexible elements being so proportioned that there is slack in said elements when the planter is in ground-engaging position with at least one of said latches engaged to hold its associated movable portion in check wire retaining relationship and tensioned to shift the latch to disengagement from its movable portion when the planter is lifted to transport position; whereby lifting the planter to transport position automatically doffs the check wire.

FREDERICK W. RIDDLE.
JOSEPH S. PILLAR.

References Cited in the file of this patent

UNITED STATES PATENTS

| Number | Name | Date |
|---|---|---|
| 489,182 | Evans | Jan. 3, 1893 |
| 584,991 | Diehl | June 22, 1897 |
| 603,584 | Waterman | May 3, 1898 |
| 712,453 | Heylman | Oct. 28, 1902 |
| 722,442 | Anderson | Mar. 10, 1903 |
| 1,566,960 | Grover | Dec. 22, 1925 |
| 1,757,990 | Anderson | May 13, 1930 |
| 2,297,299 | Graham et al. | Sept. 29, 1942 |
| 2,315,752 | White | Apr. 6, 1943 |
| 2,332,713 | Hand | Oct. 26, 1943 |
| 2,360,028 | White | Oct. 10, 1944 |
| 2,396,980 | Blue | Mar. 19, 1946 |
| 2,584,200 | Hand et al. | Feb. 5, 1952 |

FOREIGN PATENTS

| Number | Country | Date |
|---|---|---|
| 624,707 | Great Britain | June 15, 1949 |